3,345,144
PROCESS FOR PREPARING HALOMANGANESE PENTACARBONYL
Oskar E. H. Klopfer, Bloomfield Hills, and Thomas H. Coffield, Farmington, Mich., assignors to Ethyl Corporation, New York, N.Y., a corporation of Virginia
No Drawing. Filed Mar. 29, 1961, Ser. No. 99,026
6 Claims. (Cl. 23—367)

This invention relates to a process for forming halomanganese pentacarbonyl compounds from the reaction of a halogen compound with manganese pentacarbonyl hydride.

An object of this invention is to provide a novel process for the preparation of a halomanganese pentacarbonyl compound by the reaction of a halogen compound with manganese pentacarbonyl hydride. This process is roughly illustrated by way of the following chemical equation:

$$HMn(CO)_5 + X \rightarrow XMn(CO)_5$$

in which X denotes a halogen. By the term halogen, we mean to include the elements chlorine, bromine, fluorine, and iodine.

The manganese pentacarbonyl hydride reactant employed in our process is prepared by the reaction of an alkali metal manganese pentacarbonyl with an acid which has a larger dissociation constant than that of manganese pentacarbonyl hydride. This process is fully described in prior co-pending application 717,531, now abandoned.

As a halogen source we employ as a reactant in our process a carbon tetrahalide or trihalide such as carbon tetrachloride, bromoform, carbon tetrabromide, carbon tetraiodide and carbon tetrafluoride. Also, we can employ a lower alkyl or aryl halide such as methyliodide, ethyliodide, phenyliodide, butylbromide, decyliodide, and the like. In addition, we can employ an acyl halide as the halogen source. Typical acyl halides which may be employed are benzoyl chloride and acetyl bromide. These reactants have the formula RCOX in which R is a lower alkyl or aryl group (preferably a hydrocarbon) and X is a halogen as defined above.

In our process we customarily employ an inert diluent which can be an ether such as tetrahydrofuran, diethyleneglycol dimethylether, diethylether, and the like. Also, the inert diluent can be a hydrocarbon such as hexane, heptane, toluene xylenes, and the like. In certain cases we can employ water as the diluent.

Our process is carried out under normal temperature and pressure conditions by mixing the halogen reactant and manganese pentacarbonyl hydride together and separating the product from the reaction mixture by means of a filtration, crystallization, etc. In certain cases, we employ a blanketing atmosphere of an inert gas such as nitrogen, argon, helium or neon to protect the reactants from oxidative decomposition.

To further illustrate the scope of our process, there are presented the following examples in which all parts and percentages are by weight unless otherwise indicated.

*Example I*

A solution comprising 20 grams of dimanganese decacarbonyl in 200 ml. of anhydrous tetrahydrofuran was reacted with an excess of freshly prepared one percent sodium amalgam (300 grams of the amalgam) under nitrogen. An amber-green solution of sodium manganese pentacarbonyl was obtained. A 20 ml. aliquot of the solution was pipetted off under nitrogen and transferred to a test tube. It wis hydrolyzed with 50 ml. of water followed by the addition of 90 ml. of 0.01 normal hydrochloric acid. A yellow-white emulsion was formed. Seven milliliters of carbon tetrachloride was then added to the emulsion and a yellow crystalline solid immediately precipitated, which solid was identified as chloromanganese pentacarbonyl by means of its infrared spectrum and analysis. A overall yield of two grams (84.7 percent) of chloromanganese pentacarbonyl was obtained.

When Example I is repeated employing respectively carbon tetrabromide, carbon tetraiodide and carbon tetrafluoride in place of the carbon tetrachloride, there is obtained bromomanganese pentacarbonyl, iodomanganese pentacarbonyl, and fluoromanganese pentacarbonyl.

*Example II*

Seven milliliters of bromoform were added to a manganese pentacarbonyl hydride emulsion prepared as in Example I. No immediate reaction occurred, but traces of a yellow solid appeared on the surface of the solution after standing for two days. This was filtered off and the organic layer was separated from the water layer and evaporated to dryness. A mixture containing 1.3 grams of dimanganese decacarbonyl and 0.8 gram of bromomanganese pentacarbonyl was isolated. This corresponded to a 29 percent yield of bromomanganese pentacarbonyl.

By a procedure similar to that employed in Example II, methylene dibromide was reacted with aqueous manganese pentacarbonyl hydride to yield bromomanganese pentacarbonyl in a somewhat lower yield than that obtained in Example II.

*Example III*

Seven milliliters of methyl iodide was added to an aliquot of the manganese pentacarbonyl hydride emulsion prepared as in Example I. Gas evolution occurred and the organic layer reddened. After standing for approximately 48 hours, the organic layer was separated and evaporated to dryness yielding a reddish mixture. The mixture was sublimed and red crystals of iodomanganese pentacarbonyl (melting point, 112–113° C.) were collected on the cold finger. There was obtained in this manner 0.7 gram of iodomanganese pentacarbonyl which corresponded to a 24 percent yield. Also obtained was 0.3 gram (5 percent yield) of diiododimanganese octacarbonyl.

Similarly, when propyl bromide, amyl iodide, phenyl iodide, or ethyl bromide are employed in Example II in place of methyl iodide, there is obtained bromomanganese pentacarbonyl, iodomanganese pentacarbonyl, bromomanganese pentacarbonyl, and iodomanganese pentacarbonyl.

*Example IV*

A solution comprising 4 ml. of benzoylchloride in 7 ml. of isooctane was added to a manganese pentacarbonyl hydride emulsion prepared as in Example I. After standing for several days, the organic layer was separated and evaporated to dryness, yielding a mixture of chloromanganese pentacarbonyl, benzoic acid and benzaldehyde. The benzaldehyde was identified by reaction with freshly prepared 2,4-dinitrophenyl hydrazine. An orange precipitate of the 2,4-dinitrophenyl hydrazine of benzaldehyde was obtained having a melting point of 237° C. The benzoic acid was separated by washing the mixture with acid. There was obtained 0.8 gram of chloromanganese pentacarbonyl (33 percent yield) which was identified by means of its infrared spectrum.

When Example IV is repeated employing acetyl bromide, phenacyl iodide or butenoyl fluoride in place of benzoyl chloride, there is obtained bromomanganese pentacarbonyl, iodomanganese pentacarbonyl or fluoromanganese pentacarbonyl.

*Example V*

A portion of manganese pentacarbonyl hydride was dissolved in carbon tetrachloride at −20° C. to yield a nearly colorless solution. Upon warming the solution, pale yellow crystals precipitated. The crystals were analyzed by nfrared spectroscopy and were shown to be chloromanganese pentacarbonyl.

The halomanganese pentacarbonyl products prepared from our process are very useful intermediates in the preparation of cyclopentadienyl manganese tricarbonyl compounds which are known antiknock agents. To illustrate, cyclopentadienyl sodium is prepared by reacting cyclopentadiene with sodium dispersed in tetrahydrofuran. This solution is then added slowly to tetrahydrofuran solution containing chloromanganese pentacarbonyl while agitating the solution. A finely divided solid is formed and carbon monoxide is evolved. When the reaction is complete, the solvent is removed under reduced pressure and the residue is sublimed at a temperature of about 70° C. and a pressure of less than one millimeter of mercury. The product is found to contain a good yield of cyclopentodienyl manganese tricarbonyl which can be identified by comparison with an authentic sample of the compound. Similarly, reaction of one of our products—a halomanganese pentacarbonyl—with a substituted cyclopentadienyl radical, such as in methylcyclopentadienyl sodium, produces the substituted cyclopentadienyl manganese tricarbonyl.

Having fully defined our novel process and the useful products produced therefrom, we desire to be limited only within the lawful scope of the appended claims.

We claim:

1. Process comprising reacting a compound having the formula:

$$CX_mH_n$$

in which $m$ is an integer ranging from 3 to 4, $n$ is an integer ranging from zero to one, and X is a halogen, with manganese pentacarbonyl hydride to yield a compound having the formula:

$$XMn(CO)_5$$

2. Process comprising reacting benzoylchloride with an aqueous solution of manganese pentacarbonyl hydride to yield chloromanganese pentacarbonyl.

3. Process comprising reacting methyliodide with manganese pentacarbonyl hydride to yield indomanganese pentacarbonyl.

4. Process comprising reacting bromoform with manganese pentacarbonyl hydride to yield bromomanganese pentacarbonyl.

5. Process comprising reacting a compound selected from the group consisting of lower alkyl halides and lower aryl halides with manganese pentacarbonyl hydride to produce a compound having the formula:

$$XMn(CO)_5$$

in which X is a halogen.

6. Process comprising reacting a compound having the formula:

$$RCOX$$

in which R is selected from the group consisting of lower alkyl and lower aryl groups and X is a halogen, with manganese pentacarbonyl hydride to produce a compound having the formula:

$$XMn(CO)_5$$

in which X is a halogen.

References Cited

UNITED STATES PATENTS

| | | | |
|---|---|---|---|
| 2,902,489 | 9/1959 | Coffield et al. | 260—429 |
| 2,946,668 | 7/1960 | Richelsen | 23—295 X |
| 2,952,519 | 9/1960 | Podall et al. | 260—429 |
| 3,009,766 | 11/1961 | Sandel | 23—14 |
| 3,031,260 | 4/1962 | Klopfer | 23—14 |

OTHER REFERENCES

Brimm et al., J.A.C.S., vol. 76, pp. 3831–3835 (July 20, 1954).

MILTON WEISSMAN, *Primary Examiner.*

MAURICE A. BRINDISI, *Examiner.*

M. N. MELLER, *Assistant Examiner.*